United States Patent
Ito et al.

[11] Patent Number: 6,046,839
[45] Date of Patent: Apr. 4, 2000

[54] POLARIZAITON SCRAMBLER

[75] Inventors: Tomoyuki Ito; Toshihiro Ohtani, both of Sapporo; Yoshinobu Kubota; Yasuhiro Omori, both of Kawasaki, all of Japan

[73] Assignee: Fujitsu Limited, Kawasaki, Japan

[21] Appl. No.: 09/216,705

[22] Filed: Dec. 21, 1998

[30] Foreign Application Priority Data

Mar. 19, 1998 [JP] Japan ................... 10-069692

[51] Int. Cl.⁷ ........................... G02F 1/03
[52] U.S. Cl. .................. 359/246; 359/130; 359/156; 359/251; 359/305; 359/122; 356/364; 385/24; 324/244.1
[58] Field of Search ................... 359/245, 246, 359/251, 256, 281, 285, 305, 122, 130, 156, 181, 182; 356/350, 364; 385/11, 24, 31; 324/96, 244.1; 372/105, 106

[56] References Cited

U.S. PATENT DOCUMENTS

| | | | |
|---|---|---|---|
| 5,127,066 | 6/1992 | Poggiolini | 385/24 |
| 5,329,394 | 7/1994 | Calvani et al. | 359/156 |
| 5,739,943 | 4/1998 | Ohshima et al. | 359/281 |
| 5,841,571 | 11/1998 | Terahara | 359/156 |
| 5,920,413 | 7/1999 | Miyakawa et al. | 359/130 |

FOREIGN PATENT DOCUMENTS

| | | |
|---|---|---|
| 9-113854 | 5/1997 | Japan. |
| 9-162809 | 6/1997 | Japan. |
| 9-211391 | 8/1997 | Japan. |

OTHER PUBLICATIONS

OFC '98 Postdeadline Papers (Feb. 26, 1998).

*Primary Examiner*—Loha Ben
*Attorney, Agent, or Firm*—Staas & Halsey

[57] ABSTRACT

An object of the invention is to provide a polarization scrambler wherein the polarization of linearly polarized signal light can be rotated to facilitate obtaining a minimum degree of polarization, and wherein scrambling operation is possible even if signal light of optional polarization states is input. Accordingly with the polarization scrambler, a polarization rotation section is provided on an input side on a chip on which is formed an optical waveguide, and a polarization scrambling section is provided on an output side. With the polarization rotation section, the polarization of linearly polarized signal light which is transmitted by the optical waveguide is rotated by means of an acousto-optic effect due to an elastic surface wave generated by an electrode, so as to become 45° with respect to a vertical direction of the optical waveguide. With the polarization scrambling section, the polarization of the signal light from the polarization rotation section is scrambled in accordance with a modulation signal.

12 Claims, 8 Drawing Sheets

(a)

(b)

VIEW IN DIRECTION OF ARROW A (c)

VIEW IN DIRECTION OF ARROW B

POLARIZAITON SCRAMBLER

BACKGROUND OF THE INVENTION

1. Field of the Invention

The present invention relates to a polarization scrambler for scrambling the polarization of signal light, and in particular to a polarization scrambler wherein the management for example of an incident angle of a polarization direction of incident signal light is facilitated.

2. Description of the Related Art

Recently there has been progress with increases in speed and increase in long distance transmission in optical communication systems, with one of the key devices for realizing this being the polarization scrambler.

Presently long distance transmission in optical communication systems is carried out for example with a large number of optical fiber amplifiers connected in multiple stages. With such optical transmission systems, noise light generated by the optical fiber amplifiers depends on the polarized state of the signal light and hence a phenomena where excessive noise light increases (polarization hole burning) has been pointed out. Since due to the polarization hole burning, the mean value of the signal light to noise light ratio (optical SNR) decreases while the fluctuation of the optical SNR increases, this becomes a problem in performing long distance transmission. Furthermore, in the case of wavelength division multiplexing (WDM) transmission systems which multiplex and transmit light of several wavelengths, four-wave mixing (FWM), being one of the nonlinear effects of the optical transmission path, is produced so that transmission characteristics are degraded. With four-wave mixing, it is known that the generation efficiency thereof becomes a maximum in the case where the polarization states of several signal lights coincide.

As a technique for reducing the influence of such polarization hole burning and four-wave mixing, for example a technique such as polarization scrambling which positively changes the polarization of the signal light on the transmitting side to give a non polarized state, has been proposed. One means for making the polarization of the signal light random is a polarization scrambler.

As conventional polarization scramblers there are for example the known devices of Japanese Unexamined Patent Publication Nos. 9-162809, 9-211391, and 9-113854. As an example of such conventional polarization scramblers, there is the device shown in FIG. 10 which uses an electro-optic effect.

The polarization scrambler of FIG. 10 is one where an optical waveguide is formed on a substrate such as lithium niobate ($LiNbO_3$: referred to here under as LN) having an electro-optic effect, an electrode is provided on the substrate, and an optical fiber is optically coupled to the input and output side of the optical waveguide. With a polarization scrambler of this construction, as shown in FIG. 10(b), a signal light of linear polarization is input with the polarization direction at an incline of 45° to the vertical direction of the optical waveguide, and the linear polarization is resolved into a vertical component and a horizontal component. At this time, by applying a modulation signal of for example a sinusoidal wave to the electrode provided on the optical waveguide, the refractive indexes for the vertical component and the horizontal component of the optical waveguide change due to the electro-optic effect so that the speeds of the respective direction components propagated inside the optical waveguide change. As a result, a phase difference is produced between the vertical component and the horizontal component of the signal light, and as shown in FIG. 10(c) the polarization state for the output signal light becomes random.

Incidentally, one important characteristic for a polarization scrambler is the degree of polarization (DOP). The degree of polarization is a parameter showing the extent of polarization. That is to say, if the strength of the optical component in the fully polarized state is Ip, and the strength of the optical component which is not in the polarized state is Im, then the degree of polarization P is expressed by the following equation (1) which gives ratio of the polarized light component with respect to the total light amount.

$$P=Ip/(Ip+Im) \tag{1}$$

More specifically, this shows that when the value for the degree of polarization is close to zero, polarization is approximately random, while when close to 100%, polarization is approximately constant.

With the conventional polarization scrambler which utilizes the above electro-optic effect, the degree of polarization depends on the voltage of the modulation signal applied to the electrode or on the incident angle of the polarization direction of the signal light of the linear polarization input to the optical waveguide. Controlling the voltage of the signal applied to the electrode to minimize the DOP can be achieved relatively easily. However, accurately managing the incident angle of the signal light is not so easy. Heretofore, when an optical fiber is fixed to the input side of the polarization scrambler, the incident angle of the polarization direction of the signal light output from the optical fiber is adjusted so as to become 45° ±0.5° with respect to the vertical direction of the optical waveguide, to minimize the degree of polarization. However such adjustment is extremely difficult and takes much time so that there is the problem of poor manufacturability. Furthermore, once the optical fiber is fixed to the polarization scrambler, subsequent incident angle adjustment is not possible. Therefore there is also the problem that for example, it is difficult to cope with the situation when the degree of polarization changes due for example to degradation with time of the optical system components.

SUMMARY OF THE INVENTION

The present invention addresses the above problems, with the object of providing a polarization scrambler wherein the polarization of input linearly polarized signal light can be rotated to facilitate obtaining a minimum degree of polarization. Furthermore it is an object to provide a polarization scrambler wherein a minimum degree of polarization is obtained even if signal light of a non-polarized state is input.

Accordingly, the polarization scrambler of the present invention comprises:

a polarization rotation device for rotating the polarization of linearly polarized signal light, and a polarization scrambling device for scrambling the polarization of signal light output from the polarization rotation device in accordance with a modulation signal. Furthermore, the polarization rotation device may use an acousto-optic effect to rotate the polarization of signal light.

With such a construction, when the linearly polarized signal light is input to the polarization scrambler, the polarization direction of the signal light is rotated in the polarization rotation device utilizing for example an acousto-optic effect, and then sent to the polarization scrambling device. With the polarization scrambling device, the polarization of the signal light from the polarization rotation device is scrambled in accordance with the modulation signal and then output. In this way, the polarization of the input linearly polarized signal light can be adjusted by the polarization rotation device, and hence there is no longer a requirement to carry out precise angular adjustment of the polarization direction for example at the time of assembly.

As a result, an improvement in the manufacturability of the polarization scrambler can be achieved. Furthermore, since the incident angle of the linear polarization can also be adjusted even after assembly, it is possible to flexibly deal with changes in the degree of polarization due for example to degradation with time of the components.

Furthermore, as a specific construction for the polarization rotation device, this may comprise; an optical waveguide formed on a substrate, an elastic surface wave generating section for generating an elastic surface wave of a frequency corresponding to the wavelength of the signal light transmitted in the optical waveguide, and a propagation limiting section for confining the elastic surface wave generated by the elastic surface wave generating section within a predetermined region along the optical waveguide.

In addition, the polarization rotation device and the polarization scrambling device may be formed on a single substrate having an electro-optic effect. In this way, manufacture of the polarization scrambler is facilitated.

Furthermore, with the above mentioned polarization scrambler, the construction may be such that there is provided a linear polarization conversion device for converting signal light input in an optionally polarized state into linearly polarized signal light, and the signal light output from the linear polarization conversion device is input to the polarization rotation device.

With such a construction, when the signal light is input to the polarization scrambler in the optionally polarized state, at first this is converted to linear polarization by the linear polarization conversion device. Then, the linearly polarized signal light is sent to the polarization rotation device, and after rotation of the polarization, is sent to the polarization scrambling device. As a result, non-polarized signal light can be made input signal light for the polarization scrambler.

Consequently, a polarization scrambler which is independent of the input polarization is realized and hence a normal single mode fiber can be used for the input side optical fiber, thus enabling a reduction in cost of the polarization scrambler.

Furthermore, as a specific construction for the linear polarization conversion device, this may comprise a polarization separation section for separating the signal light into two polarization components perpendicular to each other, a polarization conversion section for converting one of the polarization components separated by the polarization separation section to a polarization the same as that of the other polarization component, and a multiplexing section for multiplexing one of the polarization components which has been converted by the polarization conversion section with the other polarization component. For the polarization conversion section, an acousto-optic effect or a half-wave plate may be used. Furthermore for the polarization separation section, a polarization beam splitter for separating the signal light into a TM mode and a TE mode, or a birefringent member for separating the signal light into ordinary light and extraordinary light may be used. Moreover, in the case where a polarization beam splitter is used for the polarization separation section, the linear polarization conversion device, the polarization rotation device and the polarization scrambling device may be formed on a single substrate having an electro-optic effect.

In addition with the abovementioned optical scrambler, the construction is preferably such that there is provided a degree of polarization detection device for detecting the degree of polarization of the signal light output from the polarization scrambling device, and a control device for controlling at least one of the rotation angle of the polarization in the polarization rotation device and the amplitude of the modulation signal used in the polarization scrambling device, so that the degree of polarization detected by the degree of polarization detection device becomes a minimum.

With such construction, the polarization rotation angle in the polarization rotation device or the amplitude of the modulation signal used in the polarization scrambling device, or both thereof, are controlled to an optimum value so that the degree of polarization of the signal which has been polarization scrambled becomes a minimum. In this way a minimum degree of polarization can be reliably maintained.

Other objects, features and advantages of the present invention will become apparent from the following description of embodiments given in conjunction with the appended drawings.

DESCRIPTION OF THE PREFERRED EMBODIMENTS

As follows is a description of embodiments of the present invention with reference to the drawings.

Figure 1:
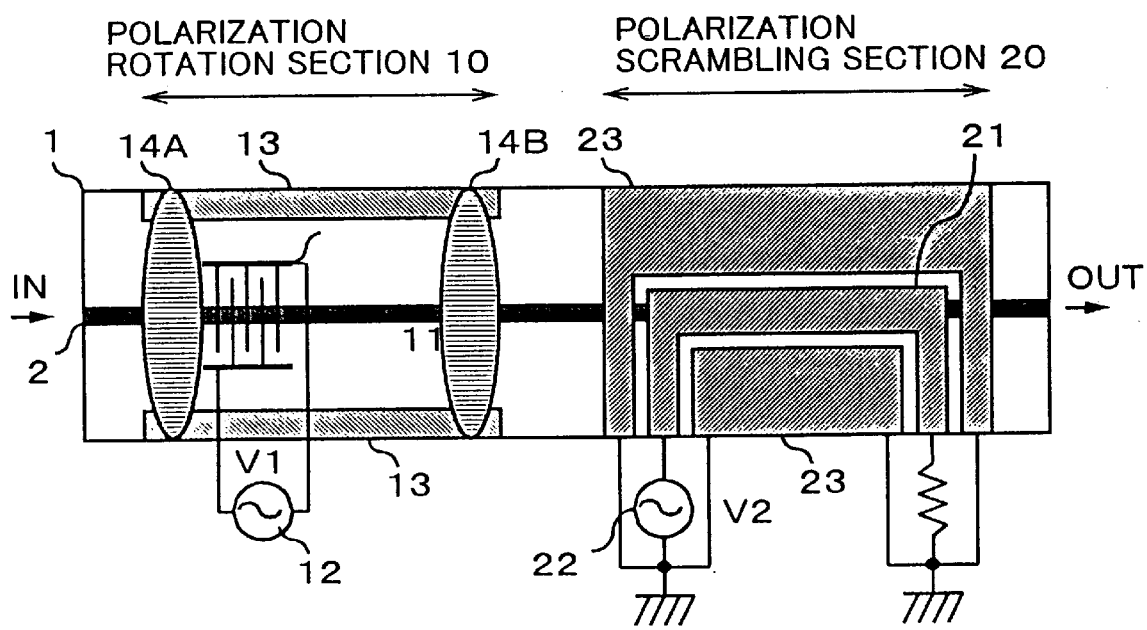
FIG. 1 is a plan view illustrating the construction of a chip used in a first embodiment of the present invention.
Figure 2:
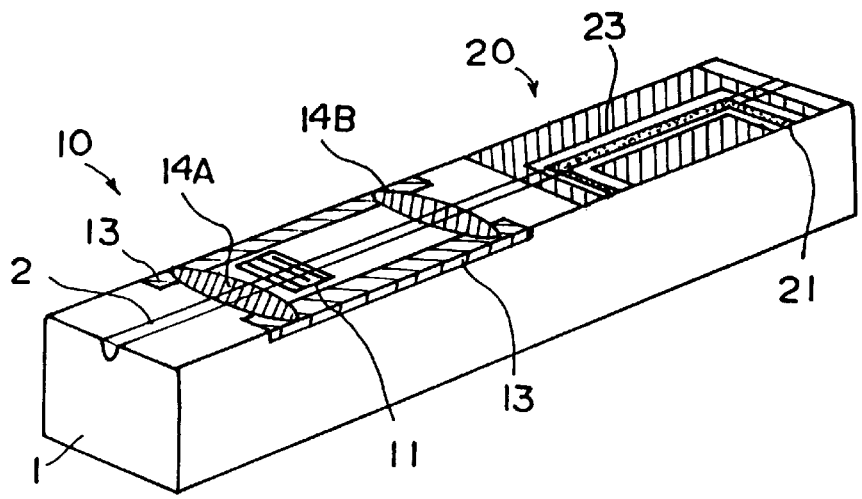
FIG. 2 is a perspective view of the chip of the first embodiment.

FIG. 1 is a plan view illustrating the construction of a chip used in a polarization scrambler according to a first embodiment. Moreover, FIG. 2 is a perspective view of the chip of FIG. 1. Furthermore, FIG. 3 is a sectional view of a polarization scrambler module in which the chip is mounted.

Figure 3:
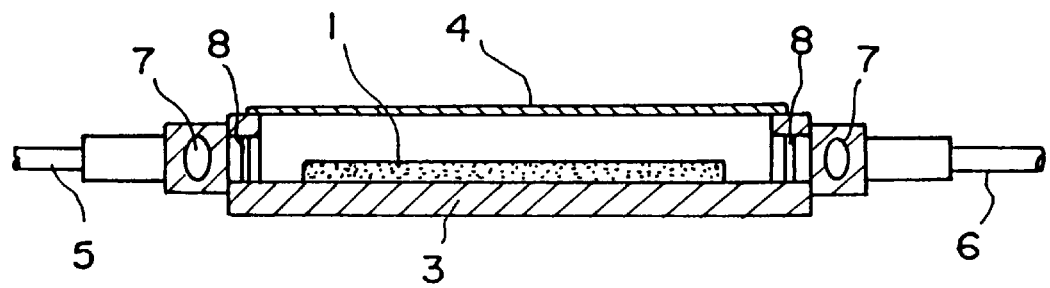
FIG. 3 is a sectional view of a polarization scrambler module of the first embodiment.

In FIGS. 1, 2 and 3, with the polarization scrambler module, a chip 1 is secured inside a package 3, and an opening of the package 3 is hermetically sealed with a lid 4. An input side optical fiber 5 and an output side optical fiber 6 are fixed to the package 3 in a condition such that optical coupling is obtained with the input and output end faces of an optical waveguide 2, via lenses 7 and sapphire windows 8. With the present embodiment, for the input side optical fiber 5, a polarization-preserving fiber which holds the polarization of the signal light constant is used, while for the output side optical fiber 6, a normal single mode fiber is used.

With the chip 1, a substrate having an electro-optic effect such as lithium niobate (LN) is used, with a polarization rotation section 10 serving as a polarization rotation device provided on an input side (left side in FIG. 1), and a polarization scrambling section 20 serving as a polarization scrambling device provided on the output side (right side in FIG. 1). The optical waveguide 2 is formed on the chip 1 on a central portion of the surface along the longitudinal direction. Furthermore, high density titanium diffusion regions 13 are formed on opposite edge portions (left side upper and lower portions in FIG. 1) of the surface located on the polarization rotation section 10. The optical waveguide 2 and the high density titanium diffusion regions 13 are formed beforehand for example by a thermal diffusion process wherein a titanium film patterned in a desired shape is thermally diffused onto the chip surface at a high temperature of around 1000° C.

The polarization rotation section 10 has, in addition to the titanium diffusion regions 13, an electrode 11 (transducer) for generating an elastic surface wave, an RF signal generator 12 for applying a predetermined RF signal to the electrode 11, and absorption bodies 14A, 14B for absorbing the elastic surface wave.

The electrode 11 is made for example as a cross finger type electrode formed at a predetermined position on the optical waveguide 2. The RF signal generator 12 generates an RF signal at a frequency corresponding to the wavelength of the signal light transmitted in the optical waveguide 2, and as described later at a voltage (amplitude) V1 corresponding to the degree of polarization of the signal light output from the present polarization scrambler. By applying this RF signal to the electrode 11, an elastic surface wave is generated from the electrode 11. For the absorption bodies 14A, 14B, for example tape or an adhesive which can absorb acoustic waves can be used. However any material can be used provided this is an elastic body which is transparent to the communication wavelength and which is good in adhesion with the substrate. With the high density titanium diffusion regions 13, the material is harder than the surrounding material and hence then the propagation speed of the acoustic wave is increased. Since the acoustic wave is transmitted easily in the portion where the propagation speed is slow, this becomes a slot waveguide for confining the elastic surface wave within the vicinity of the optical waveguide. Consequently the elastic surface wave generated from the electrode 11 is propagated inside the region surrounded by the absorption bodies 14A, 14B and the high density titanium diffusion regions 13. Here the absorption bodies 14A, 14B and the high density titanium diffusion regions 13 function as propagation limiting sections.

The polarization scrambling section 20, as with the construction of the conventional polarization scrambler which utilizes the abovementioned electrooptic effect, comprises a signal electrode 21 formed along the optical waveguide 2, a modulation signal generator 22 for applying a predetermined modulation signal to the signal electrode 21, and an earth electrode 23 formed so as to surround the signal electrode 21. The modulation signal generator 22, as described later, produces a modulation signal of voltage (amplitude) V2 corresponding to the degree of polarization of the signal light output from the present polarization scrambler.

Next is a description of the operation of the polarization scrambler of this construction.

At first, a linear polarized signal light IN is input to the polarization scrambler from the polarization-preserving fiber 5 on the input side. The signal light IN is then sent to the input end face of the optical waveguide 2 via the lens 7 and the sapphire window 8. The incident angle of the polarization direction of the signal light IN may be an optional angle, and does not need to be adjusted to 45±0.50° with respect to the vertical direction of the optical waveguide 2 as heretofore.

The signal light IN input to the optical waveguide 2 has the polarization thereof rotated by passing through the polarization rotation section 10. With the specific operation of the polarization rotation section 10, an RF signal from the RF signal generator 12 is applied to the electrode 11 to thereby generate an elastic surface wave from the electrode 11. This elastic surface wave is propagated along the substrate surface inside the region surrounded by the absorption bodies 14A, 14B and the high density titanium diffusion regions 13, along the optical waveguide 2, thereby producing a change in the optical waveguide 2 due to the acousto-optic effect. The state of the optical waveguide 2 at this time is considered to be equivalent to the state where crystals with the crystallographic axis thereof being shifted are periodically aligned. Therefore the polarization of the linearly polarized signal light IN passing through the polarization rotation section 10 is rotated. At this time, the wavelength of the signal light for which polarization is to be rotated, depends on the frequency of the elastic surface wave. Furthermore the polarization rotation angle depends on the voltage V1 of the RF signal generating the elastic surface wave, and the spacing between the absorption bodies 14A, 14B. Therefore by applying to the electrode an RF signal of a frequency corresponding to the wavelength of the input signal light IN, and changing the voltage V1 of the RF signal, the angle of polarization of the input signal light IN can be optionally changed. The voltage V1 of the RF signal is set so that the polarization direction of the signal light output from the polarization rotation section 10 becomes 45° with respect to the vertical direction of the optical waveguide 2. The specific setting of the voltage V1 is determined for example as described later by monitoring the polarization angle of the signal light OUT output from the polarization scrambler, and feedback controlling so that the polarization angle becomes a minimum.

The signal light output from the polarization rotation section 10 has the polarization thereof scrambled by passing through the polarization scrambling section 20. With the specific operation of the polarization scrambling section 20, the linearly polarized signal light input with the polarization direction inclined by 45°, is resolved into a vertical component and horizontal component. At this time, by applying a modulation signal to the signal electrode 21 provided on the optical waveguide 2, the refractive indices of the vertical component and the horizontal component of the optical waveguide 2 are changed by the electro-optic effect, so that the speed of the respective direction components transmitted inside the optical waveguide 2 changes. As a result a phase difference is produced between the vertical component and horizontal component of the signal light so that the polarization state of the output signal light OUT changes randomly.

Here a description is given of the feedback control for the voltage V1 of the RF signal and the voltage V2 of the modulation signal.

Figure 4:
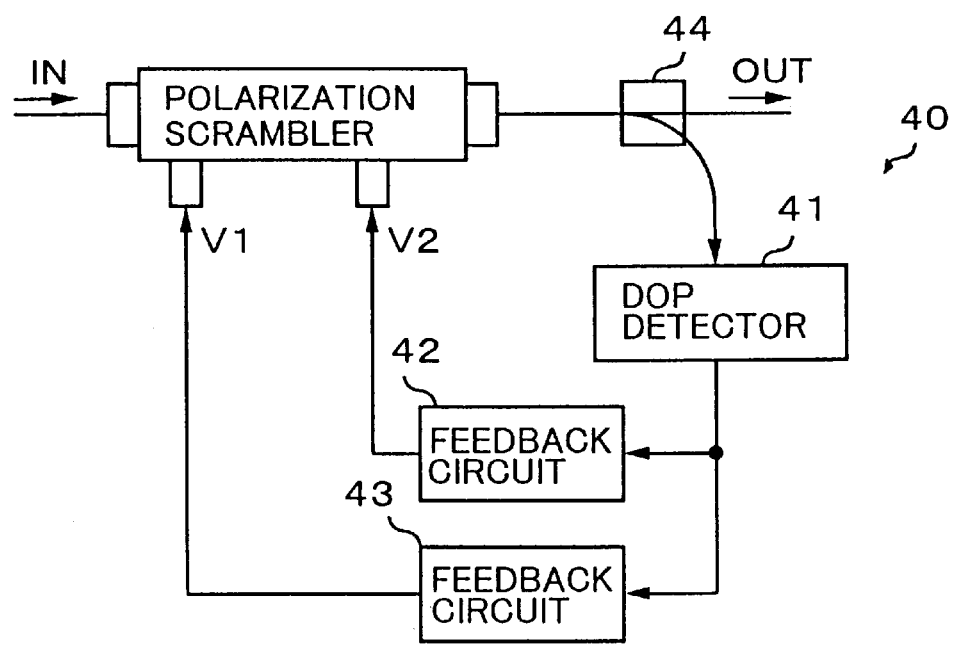
FIG. 4 is a block diagram illustrating a typical configuration of a polarization scrambler module and control section of the first embodiment.

FIG. 4 is a block diagram illustrating a typical configuration of a polarization scrambler module and control section.

In FIG. 4, a control section 40 comprises a degree of polarization (DOP) detector 41 serving as a degree of polarization detection device, feedback circuits 42, 43 serving as control devices, and an optical multiplexer 44. The optical multiplexer 44 branches one part of the signal light OUT output from the polarization scrambler module and sends this to the degree of polarization detector 41. With the degree of polarization detector 41 for example, the signal light branched by the optical multiplexer 44 is passed to a rotation detection optical element (not shown in FIG. 4), and the maximum value of the transmission strength and the minimum value of the strength in a direction perpendicular to this are then measured to compute the degree of polarization which is then output as a voltage. The feedback circuits 42, 43 output feedback signals for adjusting the voltage V2 of the modulation signal and the voltage V1 of the RF signal in accordance with the output from the degree of polarization detector 41.

For this feedback control method, for example weak amplitude modulation is respectively applied to the respective voltages V1, V2 of the RF signal and the modulation signal, and the values for the respective voltages V1, V2 are sequentially modified and controlled so that the change amount of the degree of polarization due to this amplitude modulation approaches zero. As a result, the operation of the polarization rotation section 10 and the polarization scrambling section 20 is controlled so that the degree of polarization of the signal light output from the polarization scrambler becomes a minimum. Here the method of controlling the voltages V1, V2 is not limited to that described above.

In this way, with the first embodiment, by providing the polarization rotation section 10 prior to the polarization scrambling section 20, then the polarization of the linearly polarized signal light input to the optical waveguide 2 can be optionally rotated, and hence adjustment of the input angle of the linear polarization at the time of assembling the polarization scrambler is not necessary, thus enabling an improvement in manufacturability. Furthermore, since the input angle of the linear polarization can be adjusted after assembly, it is also possible to flexibly cope with changes in the degree of polarization due for example to deterioration of the product with time. In particular, if the degree of polarization of the output signal light is monitored to effect feedback control, the voltages V1, V2 can be adjusted to the optimal value, and hence the state where the degree of polarization is a minimum can be reliably maintained. Moreover, by forming the polarization rotation section 10 and the polarization scrambling section 20 on a single substrate, gives a polarization scrambler which is even simpler to manufacture.

Next is a description of a second embodiment.

Figure 5:
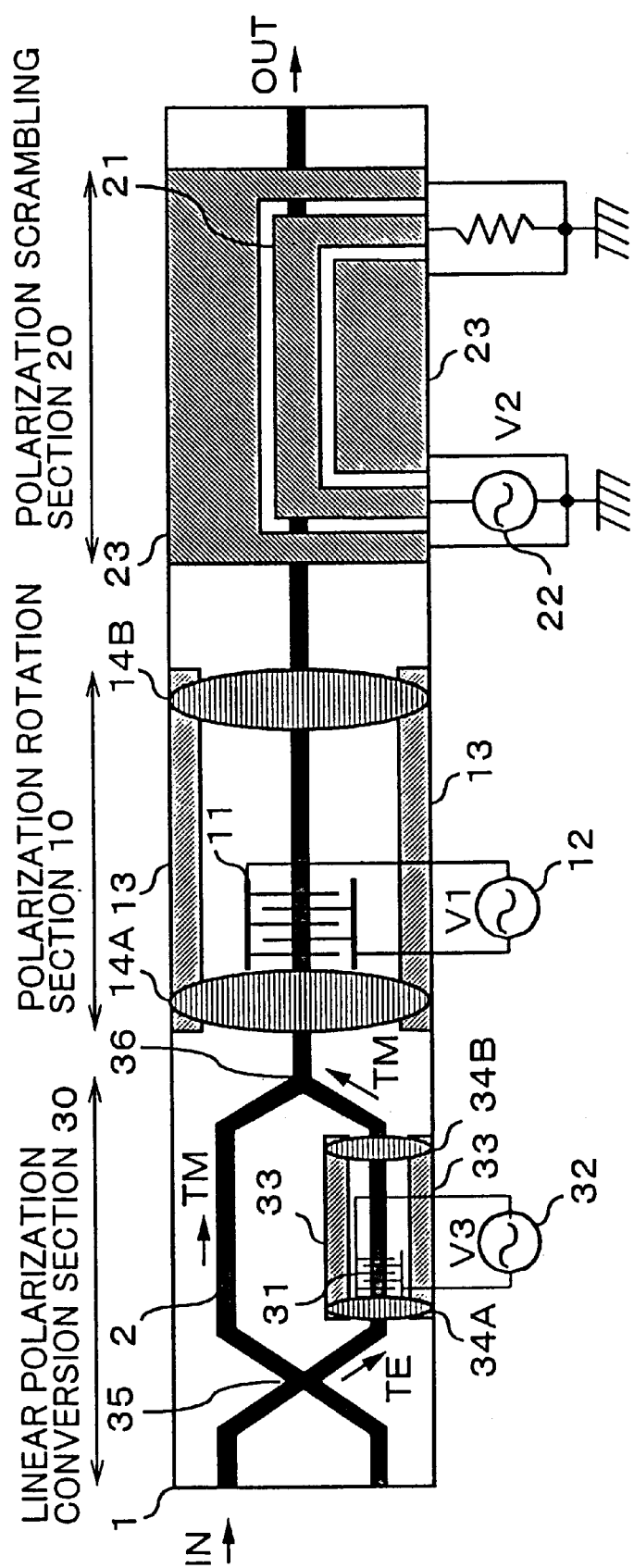
FIG. 5 is a plan view illustrating the construction of a chip used in a second embodiment of the present invention.

FIG. 5 is a plan view illustrating the construction of a chip used in a polarization scrambler of the second embodiment.

In FIG. 5 with this polarization scrambler, in addition to a polarization rotation section 10 and a polarization scrambling section 20 of a similar construction to the first embodiment, a linear polarization conversion section 30 serving as a linear polarization conversion device is formed on a single chip 1 prior to the polarization rotation section 10. The chip 1, as with the case of the abovementioned first embodiment shown in FIG. 3, is mounted inside a package 3. However, with the input side optical fiber 5 fixed to the package 3 in this embodiment, instead of a polarization-preserving fiber, a normal single mode fiber similar to the Output side optical fiber 6 is used.

The linear polarization conversion section 30 has a cross waveguide polarization beam splitter (referred here under as PBS 35 formed on the input side end portion. With the PBS 35, a signal light IN is input to one of the two input ports (the upper port in FIG. 5). Here, the other input port is not used. The input signal light IN is separated into a TM mode and a TE mode, and then respectively sent to different optical waveguides 2. In FIG. 5 the case is shown for where the TM mode component is sent in an upper side optical waveguide 2, while the TE mode component is sent to a lower side optical waveguide 2. Provided in the lower side optical waveguide 2 portion which transmits the TE mode component is an electrode 31, and RF signal generator 32, high density titanium diffusion regions 33 and absorption bodies 34A, 34B, of a similar construction to the polarization rotation section 10, thus constituting a mechanism for generating an elastic surface wave from the electrode 31. However the RF signal generator 32 generates an RF signal of voltage (amplitude) V3 such as to rotate the polarization of the signal light passing through the lower side optical waveguide 2 through 90°. Due to the acousto-optic effect caused by this mechanism, the polarization of the TE mode component is rotated through 90°, and thus mode converted to the TM mode. Then the respective TM mode components transmitted in the upper side optical waveguide 2 and the lower side optical waveguide 2 are multiplexed by an optical multiplexer 36.

Here the construction has been for where the TE mode component is mode converted, however the construction may be such that the TM mode is mode converted. Furthermore, with the optical multiplexer 36, a polarization beam splitter may be used as with the input side.

In this way, with the linear polarization conversion section 30, the signal light IN input in an optional polarization state is converted to linear polarization in the TM mode only, and then sent to the polarization rotation section 10. The polarization rotation section 10 into which the linear polarization signal light is input, rotates the polarization as with the case of the first embodiment, so that the polarization direction of the signal light becomes 45° with respect to the vertical direction of the optical waveguide 2. Then, the signal light output from the polarization rotation section 10 is sent to the polarization scrambling section 20 and polarization scrambled and then output. Here the control of the voltage V1 of the RF signal and the voltage V2 of the modulation signal is the same as for the case of the first embodiment.

In this way, with the second embodiment, by providing the linear polarization conversion section 30 prior to the polarization rotation section 10, then polarization scrambling can be carried out irrespective of the polarization state of the input signal light. As a result, a polarization scrambler which is not dependent on the polarization of the input light can be realized. Furthermore, since a single mode fiber can be used for the input side optical fiber 5 instead of the high cost polarization-preserving fiber, then a cost reduction for the polarization scrambler is possible.

Next is a description of a third embodiment

Figure 6:
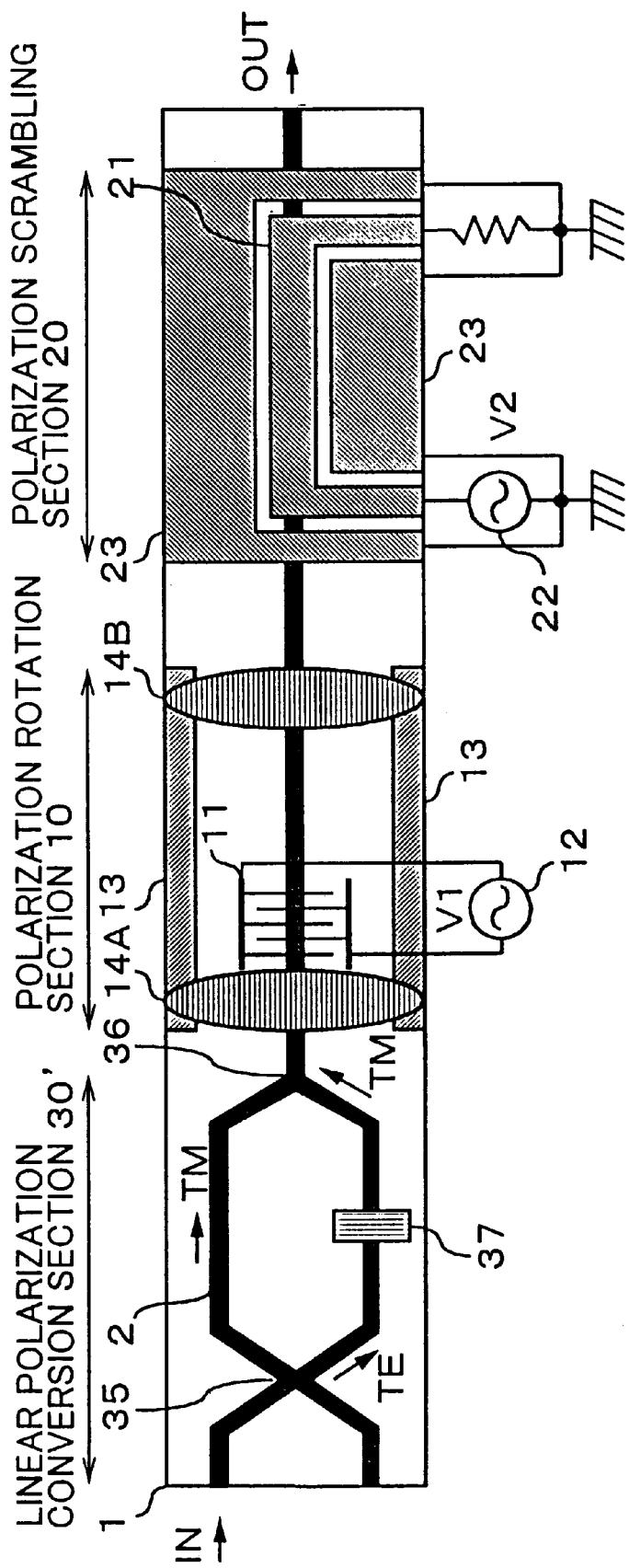
FIG. 6 is a plan view illustrating the construction of a chip used in a third embodiment of the present invention.

FIG. 6 is a plan view illustrating the construction of a chip used in a polarization scrambler of the third embodiment.

In FIG. 6, the part where the construction of the polarization scrambler differs from that of the second embodiment is that instead of the linear polarization conversion section 30, a linear polarization conversion section 30' is used. Parts other than this have the same construction as for the second embodiment.

The linear polarization conversion section 30' serves as a mechanism for mode converting the TE mode component, and instead of the mechanism for generating an elastic surface wave used in the second embodiment, a half-wave plate 37 with the crystallographic axis inclined at 45° is inserted in the lower side (in FIG. 6) optical waveguide 2. When the half-wave plate 37 passes the TE mode component, the polarization is rotated through 90° and thus converted to a TM mode. Then, the respective TM mode components transmitted in the upper side optical waveguide 2 and the lower side optical waveguide 2 are multiplexed by the optical multiplexer 36, and only the TM mode linearly polarized signal light is sent to the polarization rotation section 10. Here the half-wave plate 37 is inserted in the lower side optical waveguide 2. However the half-wave plate 37 may be inserted in the upper side optical waveguide 2 so that the TM mode component is mode converted.

Figure 7:
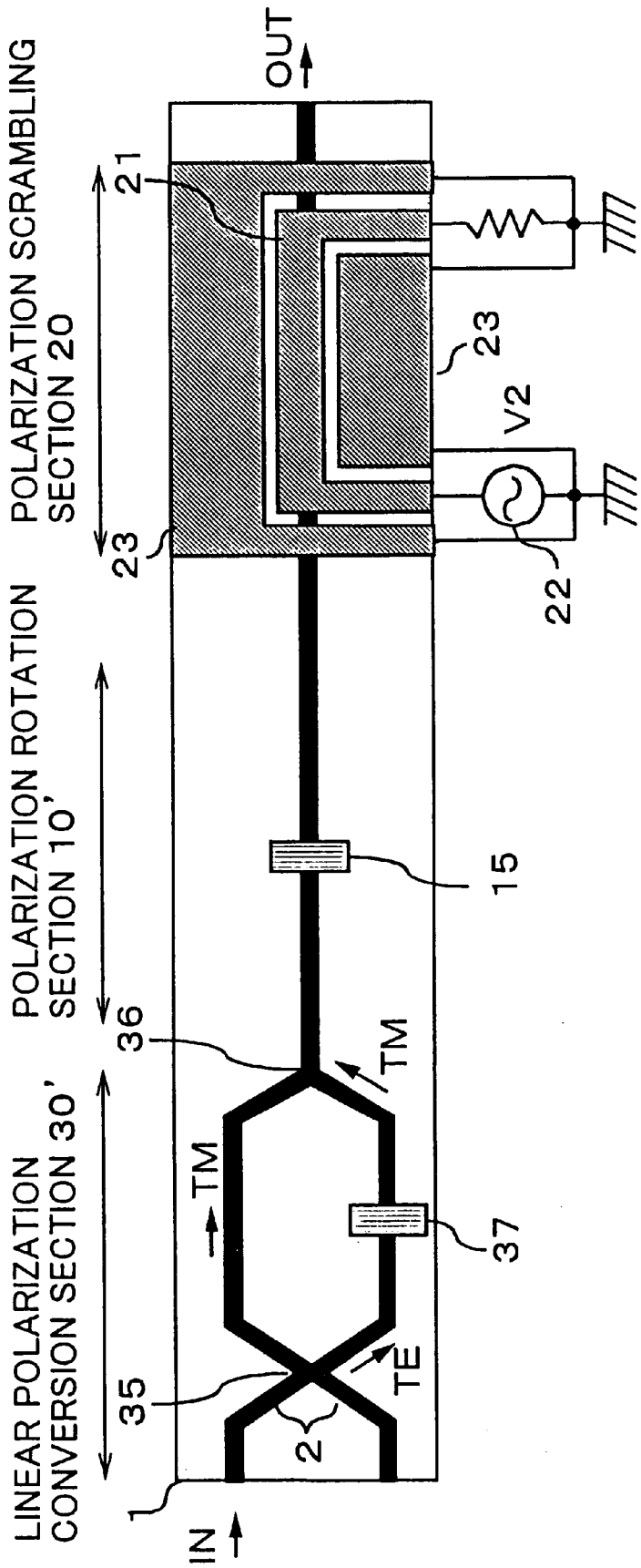
FIG. 7 is a plan view showing the construction of another chip for the case where a quarter-wave plate is used in a polarization rotation section, related to the third embodiment.

In this way with the third embodiment, even though the half-wave plate 37 is used as the mechanism for carrying out mode conversion, a similar effect to the case of the second embodiment can be obtained. However in the case where the half-wave plate 37 is used, it must be taken care that the wavelength of the signal light which can be mode converted depends on the half-wave plate 37. When dealing with the wavelength division multiplexed signal light, it is preferable to have the construction of the second embodiment capable of corresponding to an optional wavelength is possible by changing the frequency of the RF signal. In the case of dealing with the signal light of a single wavelength or the signal light of a plurality of wavelengths for which correspondence is possible using a half-wave plate 37, then by having the construction of the third embodiment, there is the advantage that electrical control in the linear polarization conversion section 30' is not required. Furthermore in this case, as shown in FIG. 7 with the polarization rotation section also, instead of the mechanism where an elastic surface wave is generated, it is also possible to apply a construction using a quarter-wave plate 15 which rotates the polarization through 45°.

Next is a description of a fourth embodiment.

Figure 8:
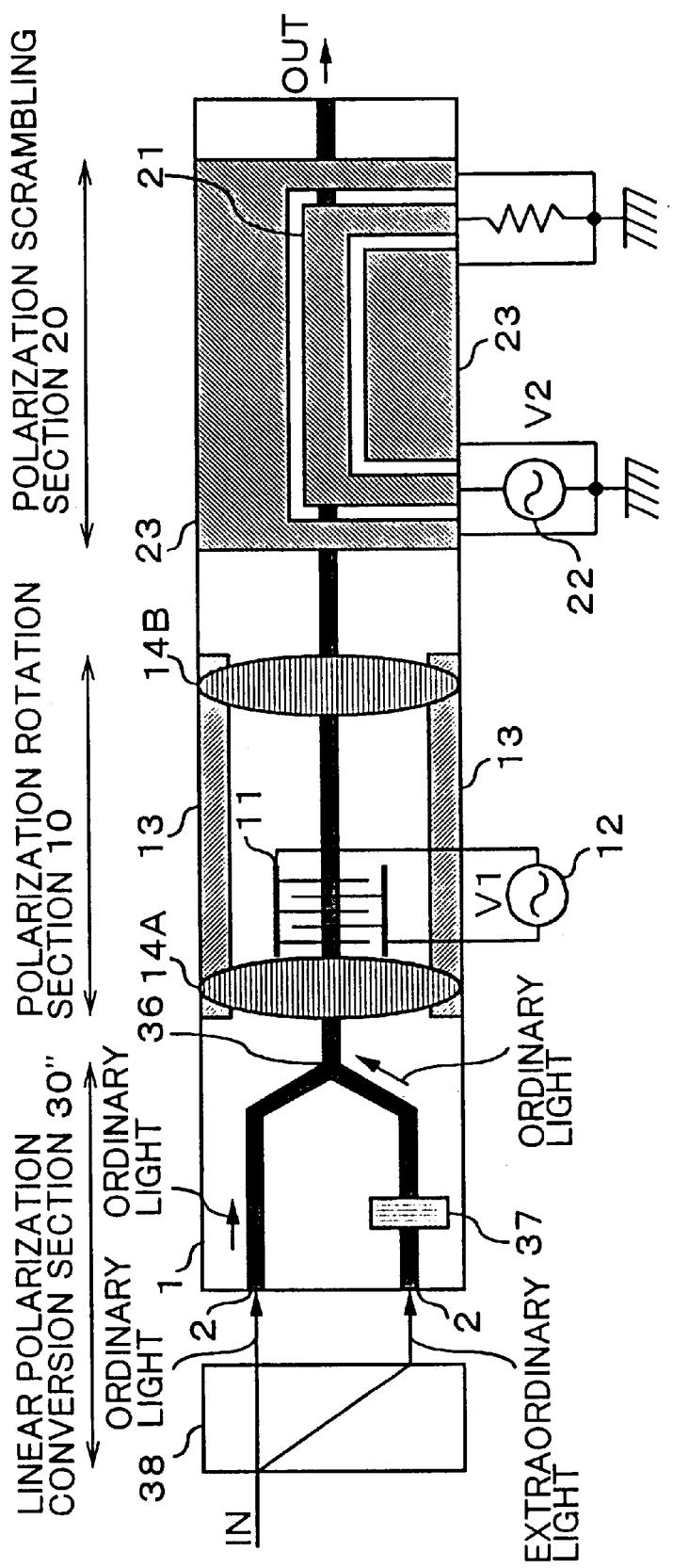
FIG. 8 is a plan view illustrating the construction of a chip used in a fourth embodiment of the present invention.

FIG. 8 is a plan view illustrating the construction of a chip used in a polarization scrambler of the fourth embodiment.

In FIG. 8, the part where the construction of the polarization scrambler differs from that of the third embodiment is that instead of the PBS 35 formed on the chip 1 in the linear polarization conversion section 30' of the third embodiment, a birefringent crystalline plate 38 is disposed on the input side of the chip 1. Parts other than this have the same construction as for the third embodiment.

The birefringent crystalline plate 38 separates the input signal light IN of an optional polarization state into ordinary light and extraordinary light. The separated ordinary light and extraordinary light are optically coupled at respective input end faces of two optical waveguides 2 formed on the chip 1. Here the ordinary light is sent to the upper side (in FIG. 8) optical waveguide 2, while the extraordinary light is sent to the lower side optical waveguide 2. As with the case of the third embodiment, a half-wave plate 37 is inserted in the lower side optical waveguide 2, so that the polarization of the extraordinary light is rotated through 90° and thus converted to ordinary light. Then the respective ordinary lights which are transmitted by the upper side optical waveguide 2 and the lower side optical waveguide 2 are multiplexed by the optical multiplexer 36, and only the ordinary linearly polarized signal light is sent to the polarization rotation section 10. Here the half-wave plate 37 is inserted in the lower side optical waveguide 2. However the half-wave plate 37 may be inserted in the upper side optical waveguide 2 so that the ordinary light is converted.

In this way with the fourth embodiment, even though the linearly polarized conversion section is constructed using the birefringent crystalline plate 38, a similar effect to the case of the third embodiment can be obtained.

Next is a description of a fifth embodiment.

Figure 9:
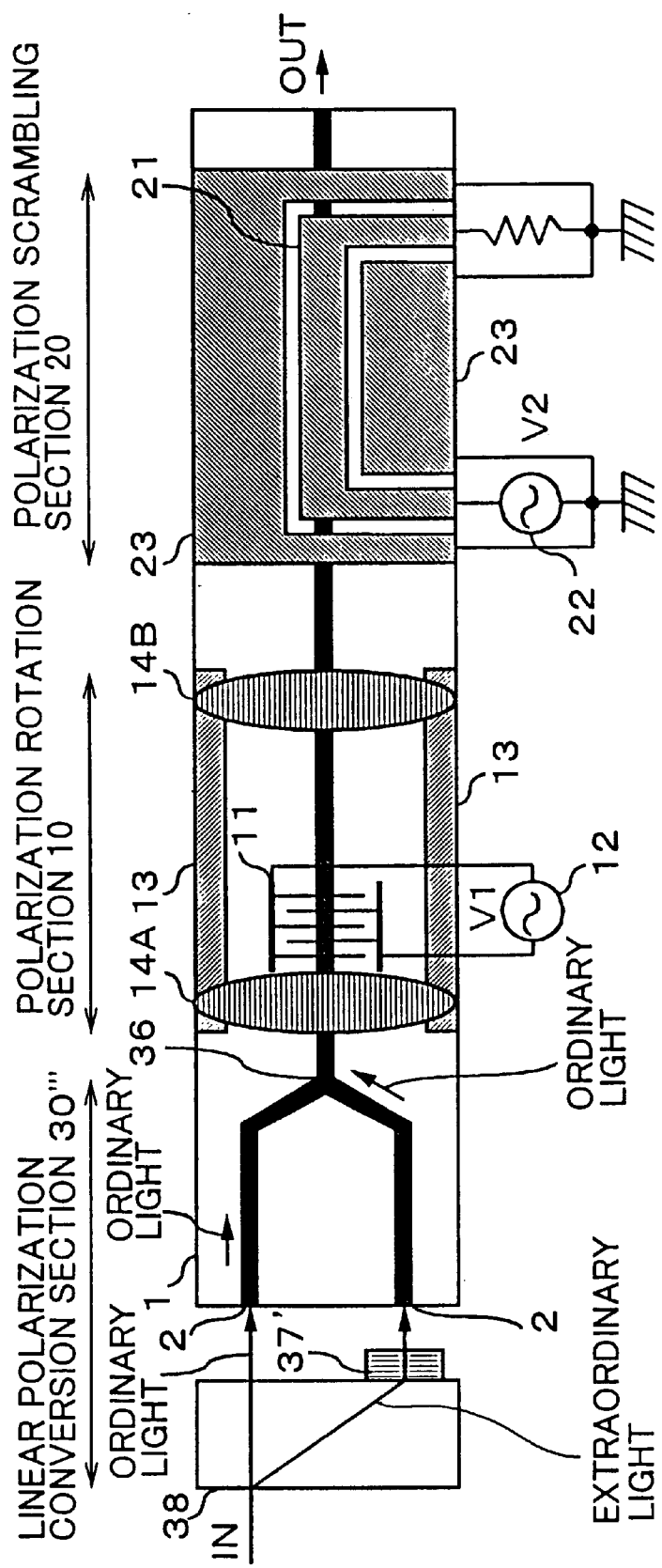
FIG. 9 is a plan view illustrating the construction of a chip used in a fifth embodiment of the present invention.
Figure 10:
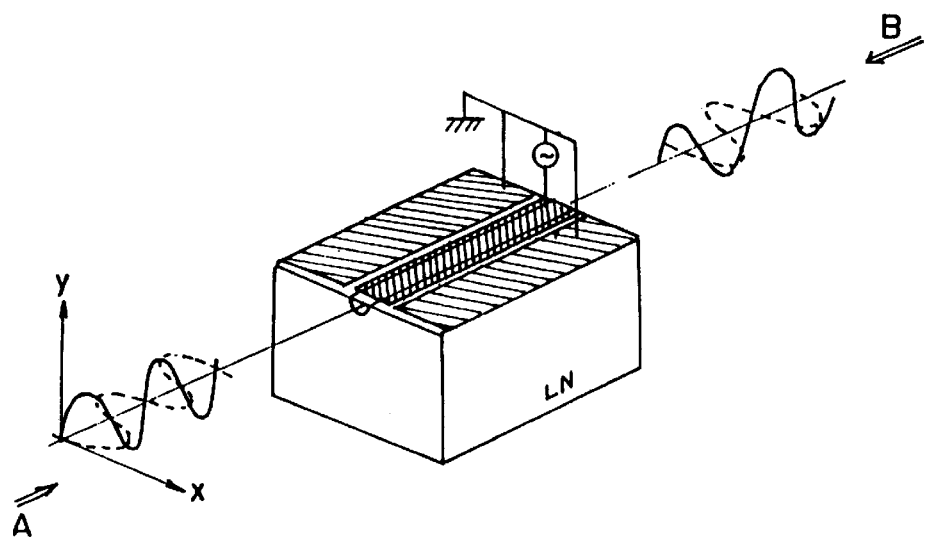
FIG. 10 is a diagram showing an example of a conventional polarization scrambler which utilizes an electro-optic effect.
Figure 10:
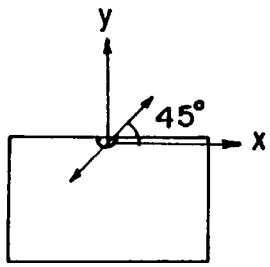
Figure 10:
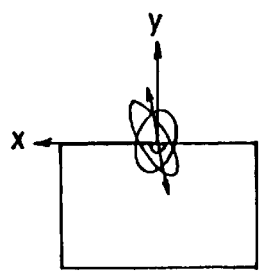

FIG. 9 is a plan view illustrating the construction of a chip used in a polarization scrambler of the fifth embodiment.

In FIG. 9, the part where the construction of the polarization scrambler differs from that of the fourth embodiment is that the half-wave plate 37 inserted in the optical waveguide 2 on the chip 1 in the fourth embodiment, is provided on one output end face of the birefringent crystalline plate 38. Parts other than this have the same construction as for the fourth embodiment.

A half-wave plate 37' is here fixed to the end face of the birefringent crystalline plate 33 which outputs the extraordinary light, in a condition with the crystallographic axis inclined at 45°. Due to this half-wave plate 37', the polarization of the extraordinary light output from the birefringent crystalline plate 38 is rotated through 90° and thus converted to a state the same as for the ordinary light, and then sent to the lower side (in FIG. 9) optical waveguide 2 on the chip 1. Then the respective ordinary lights transmitted in the upper side optical waveguide 2 and the lower side optical waveguide 2 are multiplexed by the optical multiplexer 36, and only the ordinary linearly polarized signal light is sent to the polarization rotation section 10. Here the half-wave plate 37' is provided on the end face of the birefringent crystalline plate 38 which outputs the extraordinary light. However this may be provided on the end face which outputs the ordinary light so that the ordinary light is converted.

In this way, with the fifth embodiment, even though the half-wave plate 37' is provided on the output end face of the birefringent crystalline plate 38, a similar effect to the case of the fourth embodiment can be obtained. In addition, since the half-wave plate need not be provided on the chip 1, then manufacture of the chip 1 is simplified and yield improved.

Here with fourth and fifth embodiments, the case for where the polarization rotation section 10 has a mechanism for generating an elastic surface wave is shown in FIG. 8 and FIG. 9. However as shown in FIG. 7, a polarization rotation section 10' using a quarter-wave plate 15 is also possible.

Moreover, with the abovementioned respective embodiments, as the device for rotating the polarization of the signal light, the description has been for the case where the acousto-optic effect due to the elastic surface wave is used, and a half-wave plate is used. However the present invention is not limited to this, and for example a Faraday rotation element or the like may be used.

What we claimed are:

1. A polarization scrambler comprising:
    polarization rotation means for rotating the polarization of linearly polarized signal light, and
    polarization scrambling means for scrambling the polarization of signal light output from said polarization rotation means in accordance with a modulation signal.

2. A polarization scrambler according to claim 1, wherein said polarization rotation means uses an acousto-optic effect to rotate the polarization of the signal light.

3. A polarization scrambler according to claim 2, wherein said polarization rotation means comprises: an optical waveguide formed on a substrate, an elastic surface wave generating section for generating an elastic surface wave of a frequency corresponding to the wavelength of the signal light transmitted in said optical waveguide, and a propagation limiting section for confining the elastic surface wave generated by said elastic surface wave generating section within a predetermined region along said optical waveguide.

4. A polarization scrambler according to claim 1, wherein said polarization rotation means and said polarization scrambling means are formed on a single substrate having an electro-optic effect.

5. A polarization scrambler according to claim 1, wherein there is provided a linear polarization conversion means for converting signal light input in an optional polarized state into linearly polarized signal light, and the signal light output from said linear polarization conversion means is input to said polarization rotation means.

6. A polarization scrambler according to claim 5, wherein said linear polarization conversion means comprises: a polarization separation section for separating the signal light into two polarization components perpendicular to each other, a polarization conversion section for converting one of the polarization components separated by said polarization separation section to a polarization component the same as that of the other polarization component, and a multiplexing section for multiplexing one of the polarization components which has been converted by said polarization conversion section with said other polarization component.

7. A polarization scrambler according to claim 6, wherein said polarization conversion section uses an acousto-optic effect to rotate the polarization of said one polarization component through 90°.

8. A polarization scrambler according to claim 6, wherein said polarization conversion section uses a half-wave plate to rotate the polarization of said one polarization component through 90°.

9. A polarization scrambler according to claim 6, wherein said polarization separation section includes a polarization beam splitter for separating the signal light into a TM mode and a TE mode.

10. A polarization scrambler according to claim 6, wherein said polarization separation section includes a birefringent member for separating the signal light into ordinary light and extraordinary light.

11. A polarization scrambler according to claim 5, wherein said linear polarization conversion means, said polarization rotation means and said polarization scrambling means are formed on a single substrate having an electro-optic effect.

12. A polarization scrambler according to claim 1, wherein there is provided degree of polarization detection means for detecting the degree of polarization of the signal light output from said polarization scrambling means, and control means for controlling at least one of the rotation angle of the polarization in said polarization rotation means and the amplitude of said modulation signal used in said polarization scrambling means, so that the degree of polarization detected by said degree of polarization detection means becomes a minimum.

* * * * *

UNITED STATES PATENT AND TRADEMARK OFFICE
CERTIFICATE OF CORRECTION

PATENT NO.: 6,046,839
DATED : April 4, 2000
INVENTOR(S): Tomoyuki ITO, et al.

It is certified that [an/error[s]] appears in the above-identified patent and that said Letters Patent is hereby corrected as shown below:

Item [54] Title and Line 1, Column 1, change "Polarizaiton" to -- Polarization --

Signed and Sealed this

Thirtieth Day of January, 2001

*Attest:*

Q. TODD DICKINSON

*Attesting Officer*  *Director of Patents and Trademarks*